(12) United States Patent
Gan

(10) Patent No.: US 6,469,889 B1
(45) Date of Patent: Oct. 22, 2002

(54) RAIL ASSEMBLY FOR DATA STORAGE DEVICE

(75) Inventor: Li Yuan Gan, ShenZhen (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 60 days.

(21) Appl. No.: 09/685,413

(22) Filed: Oct. 10, 2000

(30) Foreign Application Priority Data

Jul. 14, 2000 (TW) .......................................... 089212217

(51) Int. Cl.$^7$ .............................. G06F 1/16; H05K 7/14
(52) U.S. Cl. ...................... 361/685; 361/727; 361/798
(58) Field of Search .............................. 361/685, 727, 361/725, 724, 799, 730, 741, 756, 758, 798

(56) References Cited

U.S. PATENT DOCUMENTS

| 5,142,447 A | * | 8/1992 | Cooke et al. | 361/685 |
| 5,262,923 A | * | 11/1993 | Batta et al. | 361/685 |
| 5,599,080 A | * | 2/1997 | Ho | 312/334.7 |
| 5,734,557 A | * | 3/1998 | McAnally et al. | 361/727 |
| 6,304,457 B1 | * | 10/2001 | Liu et al. | 361/799 |
| 6,313,985 B1 | * | 11/2001 | Chen et al. | 361/685 |

* cited by examiner

Primary Examiner—Lynn D. Feild
(74) Attorney, Agent, or Firm—Wei Te Chung

(57) ABSTRACT

A rail assembly (10) includes a rail (12) and an electrically conductive fastener (14) secured to the rail. The rail which is U-shaped in cross-section includes a base (16) and a pair of flanges (18) extending from opposite longitudinal edges of the base, to define a receiving space therebetween for receiving the fastener. A hollow cylinder (24) extends from the base into the receiving space. A pair of posts (25) extends from the base in a direction opposite to the cylinder, for engaging with two holes (82) defined in a side wall of a data storage device (80). Each, flange defines a plurality of slots (29). The fastener includes a body (34), a handle portion (32), and a resilient portion (28) between the handle portion and the body. The body defines a through hole (42) for receiving the cylinder of the rail. A plurality of resilient fingers (46) is formed at the body for extending into the slots of the rail and electrically contacting a computer enclosure (90). The data storage device with two rail assemblies attached thereto is inserted into the computer enclosure, being guided and held by grooves defined in the enclosure.

10 Claims, 5 Drawing Sheets

RAIL ASSEMBLY FOR DATA STORAGE DEVICE

BACKGROUND

1. Field of the Invention

The present invention relates to a rail assembly for a data storage device, and particularly to a rail assembly for readily mounting a data storage device to a computer enclosure.

2. The Related Art

Conventionally, a data storage device is attached to a drive bracket of a computer by bolts, as disclosed in Taiwan Patent Application No. 77203641. The data storage device may, for example, be a hard disk drive, a floppy disk drive or a CD-ROM drive. However, attachment by bolts is complicated and time-consuming. Furthermore, attachment by such means requires extra working space to be available inside the computer enclosure. This requirement runs counter to the trend toward miniaturization in the computer industry.

To overcome the above problems, rails have been developed to mount a data storage device to a computer enclosure. Such rails are disclosed in Taiwan Patent Applications Nos. 77210426, 78201813, 79209891, and 82202204, and U.S. Pat. No. 5,332,306. Two such rails are attached to respective opposite sides of a data storage device by bolts. This assembly is then slidably inserted into the computer enclosure. However, mounting the rails to the data storage device by bolts is still complicated and time-consuming.

Additionally, electrostatic charges are easily built up on the casing of a data storage device during operation. Conventional rails attached to a data storage device for fixing the device inside a computer enclosure are generally made of plastic. The plastic rails do not allow electrostatic discharge from the casing to the enclosure. Having additional electrical grounding paths to discharge accumulated electrostatic charges on the data storage device is important. Otherwise, such charges may reduce the stability of the computer system or even damage it.

SUMMARY OF THE INVENTION

Accordingly, an object of the present invention is to provide a rail assembly which facilitates mounting of a rail thereof to a date storage device.

Another object of the present invention is to provide a rail assembly for readily attaching a data storage device to a computer enclosure and simultaneously grounding the data storage device.

To achieve the above-mentioned objects, a rail assembly in accordance with the present invention comprises a rail and an electrically conductive fastener secured to the rail. The rail is U-shaped in cross-section. It comprises a base and a pair of flanges extending from respective opposite longitudinal edges of the base, to define a receiving space therebetween for receiving the fastener. A hollow cylinder extends from the base into the receiving space. A pair of posts extends from the base in a direction opposite to the cylinder, for engaging with two holes defined in a side wall of a data storage device. Each flange defines a plurality of slots. The fastener includes a body, a handle portion, and a resilient portion between the handle portion and the body. The body defines a through hole for receiving the cylinder of the rail. A plurality of resilient fingers is formed at the body, for extending into the slots of the rail and electrically contacting a computer enclosure. An aperture is defined in the handle portion for engaging with a tab of the computer enclosure. The data storage device with two rail assemblies attached thereto is inserted into the computer enclosure, being guided and held by grooves defined in the enclosure.

Other objects, advantages and novel features of the present invention will be apparent from the following detailed description of a preferred embodiment of the present invention with reference to the attached drawings, in which:

DESCRIPTION OF THE PREFERRED EMBODIMENT

Figure 1:
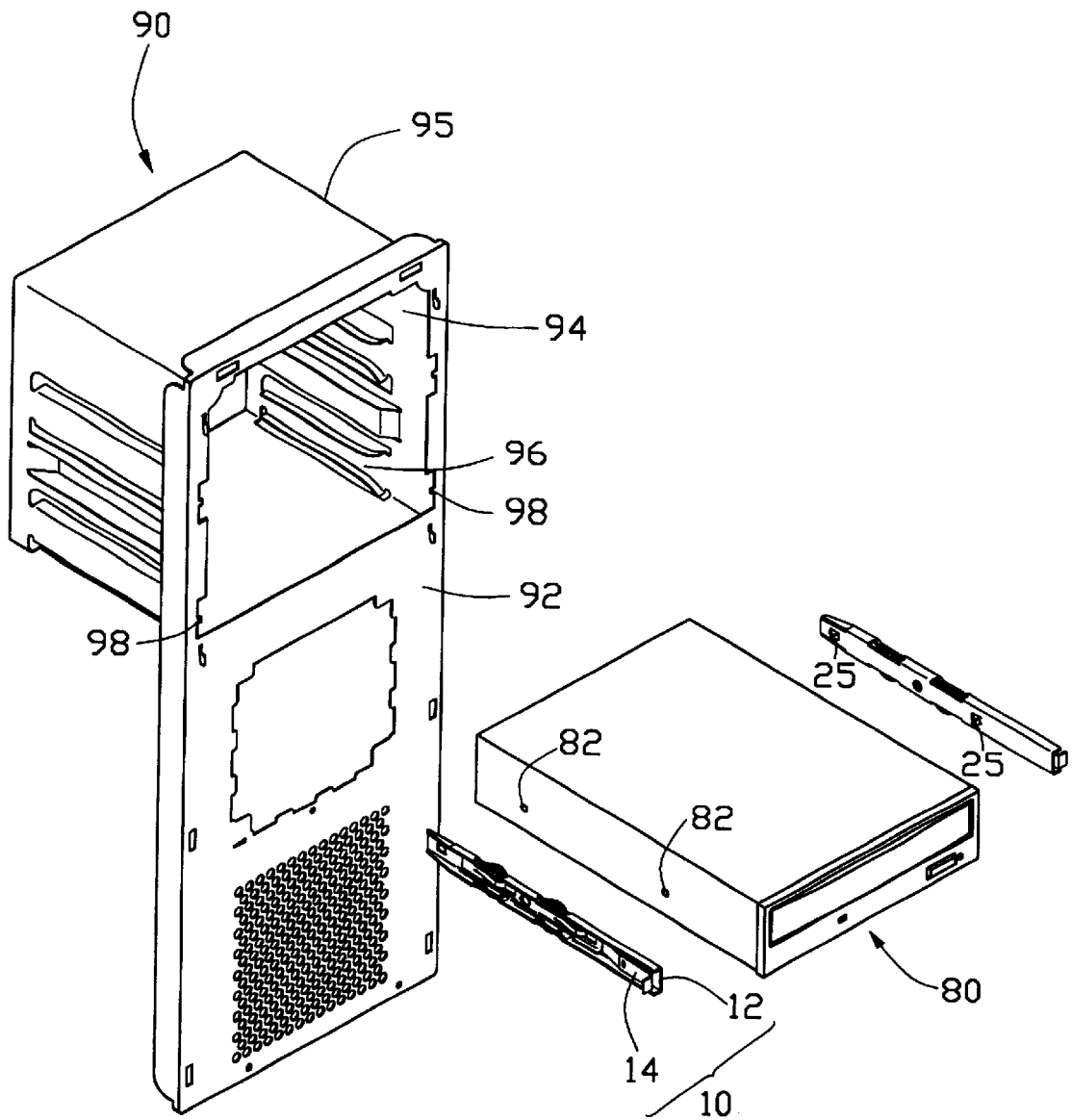
FIG. 1 is an exploded view of a computer enclosure, a data storage device and a pair of rail assemblies of the present invention.

FIG. 1 shows a pair of rail assemblies 10 of the present invention for attaching a data storage device 80 to a drive bracket 95 of a computer enclosure 90.

The computer enclosure 90 comprises a front panel 92 defining an opening 94 therein, and an internal drive bracket 95 in general alignment with the opening 94. A plurality of pairs of mutually opposing tabs 98 is formed on the front panel 92, each pair being formed at respective opposite sides of the opening 94. A plurality of pairs of guiding grooves 96 is formed on the inside of respective mutually opposite side walls (not labeled) of the drive bracket 95, for guiding corresponding pairs of rail assemblies 10 into the drive bracket 95.

Figure 2:
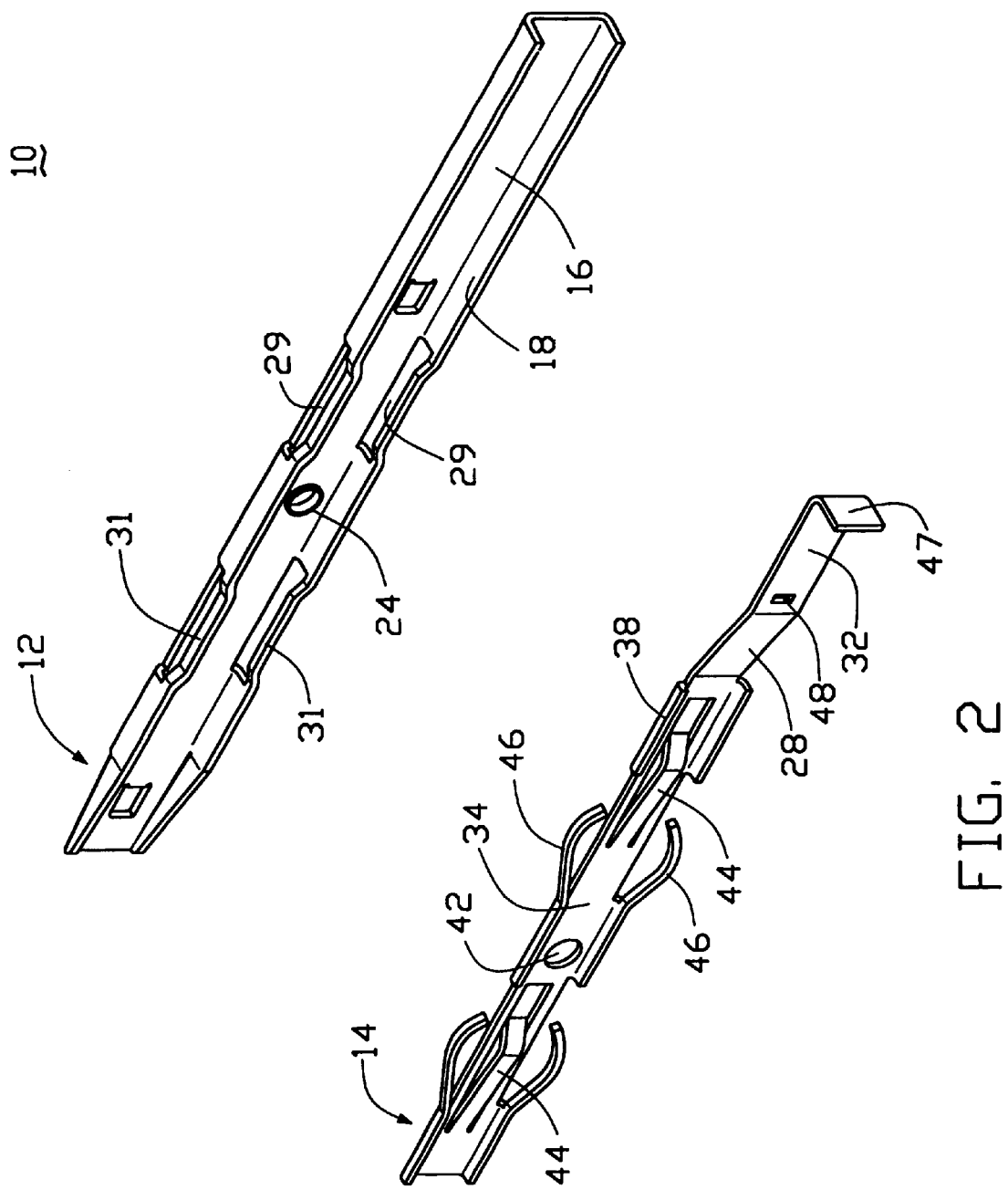
FIG. 2 is an exploded view of one rail assembly of FIG. 1.

Also referring to FIG. 2, each rail assembly 10 comprises a rail 12 having a U-shaped cross section, and an electrically conductive fastener 14 secured to the rail 12. The rail 12 comprises a base 16 and a pair of flanges 18 extending perpendicularly from respective opposite longitudinal edges of the base 16, to define a receiving space (not labeled) therebetween for receiving the fastener 14 therein. A pair of posts 25 extends perpendicularly from the base 16 in a direction opposite to the direction in which the flanges 18 extend, for engaging with two holes 82 defined in a side surface (not labeled) of the data storage device 80. A hollow cylinder 24 extends from the base 16 into the receiving space (not labeled). Each flange 18 forms a pair of recessed sections 31 on respective opposite sides of the cylinder 24. Each recessed section 31 defines a slot 29 therein. Each pair of recessed sections 31 in one flange 18 opposes the other pair of recessed sections 31 in the opposite flange 18, and each slot 29 in one recessed section 31 opposes another slot 29 in the opposite recessed section 31.

The fastener 14 has a body 34, a resilient portion 28, and a handle portion 32. The resilient portion 28 extends from an end of the body 34, and the handle portion 32 extends from an end of the resilient portion 28 opposite to the body 34. The body 34 defines a through hole 42 for engaging with the cylinder 24 of the rail 12. The body 34 forms a pair of resilient tongues 44 on opposite sides of the hole 42. A pair of beams 38 extends perpendicularly from respective opposite longitudinal edges of the body 34. Each beam 38 forms a pair of resilient fingers 46, for engagement with the slots 29 of the rail 12. The handle portion 32 defines an aperture 48 near the connecting portion 28, for engaging with the corresponding tab 98 of the computer enclosure 90. A handlebar 47 extends perpendicularly from a free end of the handle portion 32, in the same direction as the beams 38.

Figure 3:
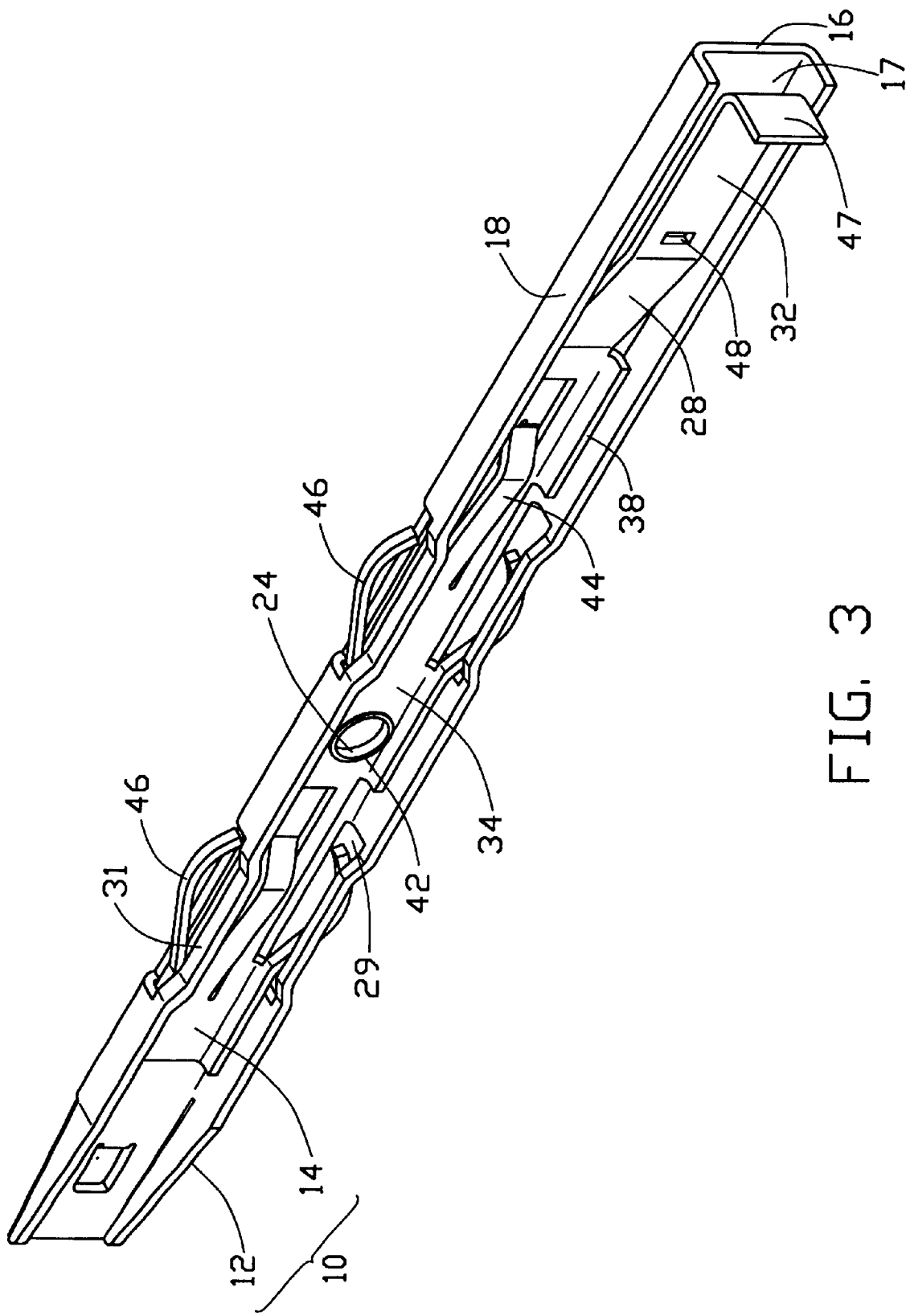
FIG. 3 is an assembled view of FIG. 2.

Referring to FIG. 3, in pre-assembly, each fastener 14 is placed into the receiving space (not labeled) of the corresponding rail 12. The cylinder 24 of the rail 12 extends into the hole 42 of the fastener 14. The fingers 46 of the fastener 14 extend through the slots 29 of the rail 12. The beams 38 of the fastener 14 respectively engage with the flanges 18 of the rail 12 The engagement of the cylinder 24 of the rail 12 with the hole 42 of the fastener 14 prevents the fastener 14 from moving in any direction parallel to the rail 12, except a rotational direction. The engagement of the beams 38 of the fastener 14 with the flanges 18 of the rail 12 prevents the fastener from moving in the rotational direction. The engagement of the fingers 46 of the fastener 14 with the slots 29 of the rail 12 prevents the fastener 14 from moving in a direction perpendicular to the rail 12. Thus the fastener 14 is firmly secured to the rail 12. A space 17 is formed between the handle portion 32 of the fastener 14 and an opposing portion (not labeled); of the base 16 of the rail 12, for allowing the resilient portion 28 of the fastener 14 to be elastically deformed.

Figure 4:
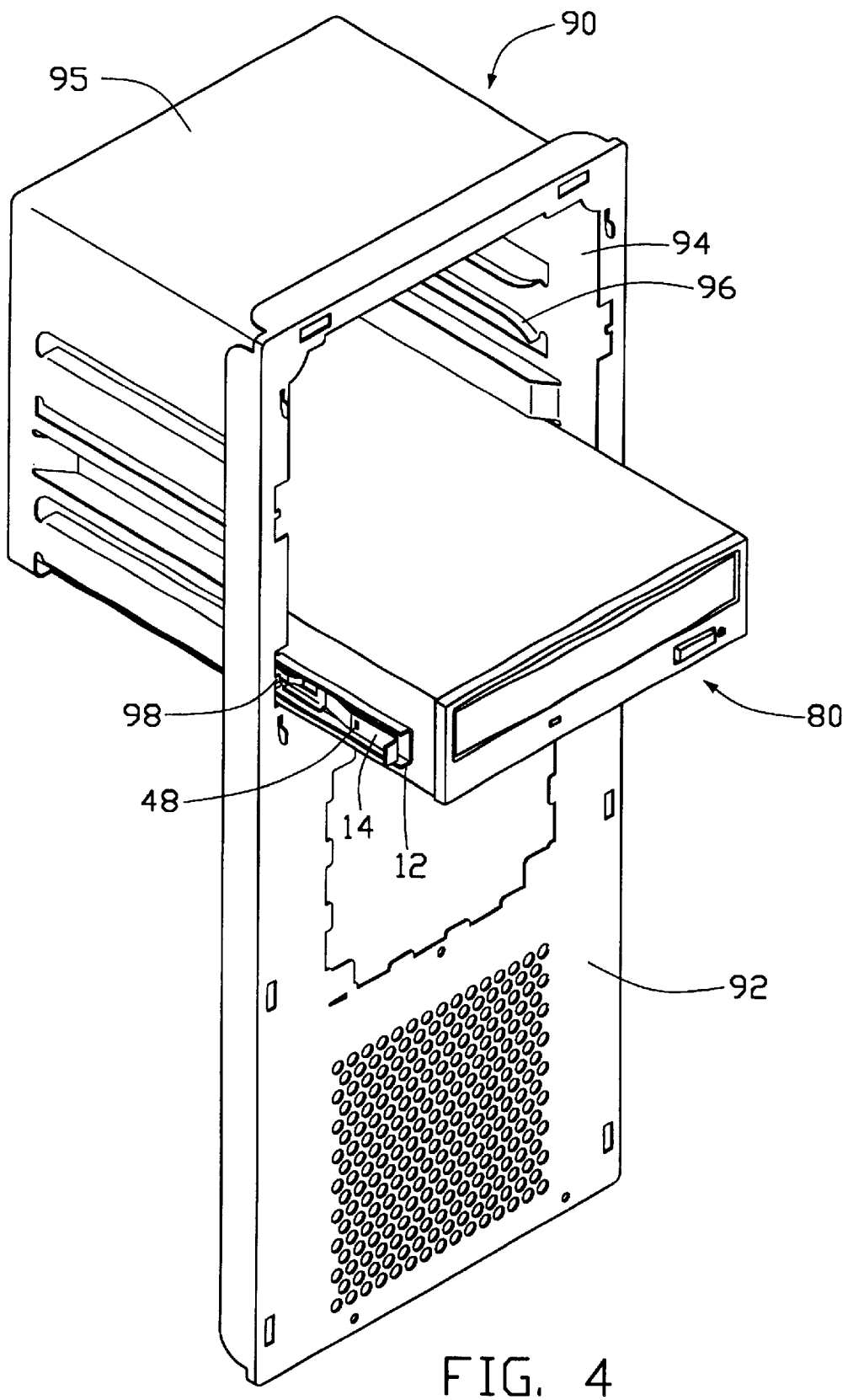
FIG. 4 is a partly assembled view of FIG. 1, showing the data storage device with the pair of rail assemblies attached thereto being partly inserted into the computer enclosure.
Figure 5:
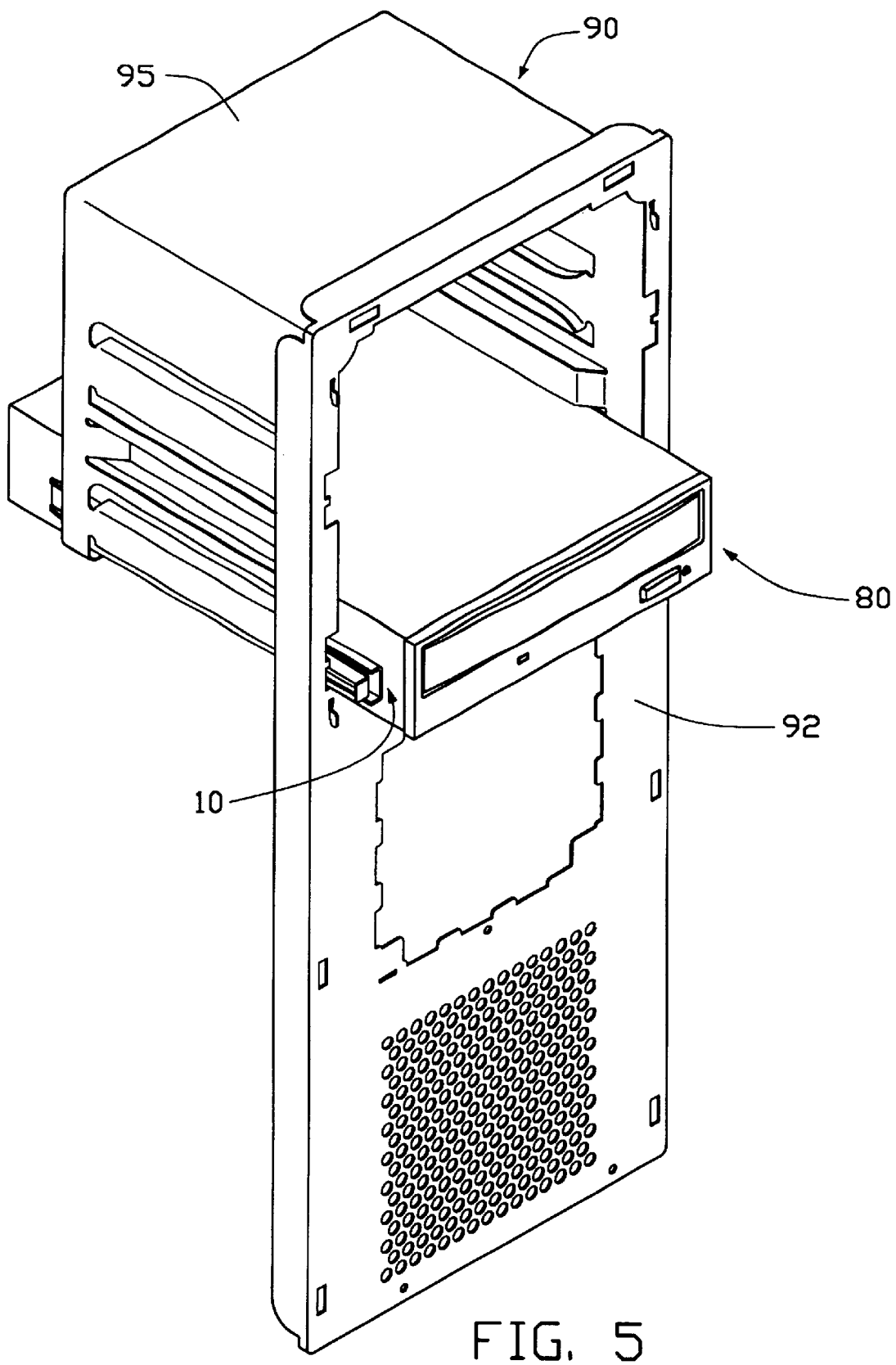
FIG. 5 is a completely assembled view of FIG. 1.

Referring to FIGS. 1, 4 and 5, in assembly, a pair of rail assemblies 10 is attached to respective opposite sides of the data storage device 80,with the posts 25 of each rail assembly 10 inserting into the corresponding holes 82 of the data storage device 80. Then the data storage device 80 with the pair of rail assemblies 10 mounted thereon is inserted into the opening 94 of the computer enclosure 90. The data storage device 80 is guided into the drive bracket 95 by the guiding grooves 96. The data storage device 80 is pushed inwardly until the tabs 98 of the front panel 92 cause the resilient portions 28 of the fasteners 14 to be deformed in respective outward directions. The data storage device 80 is pushed further inwardly until the tabs 98 are resiliently snapped into the corresponding apertures 48 of the fasteners 14. Thus the pair of rail assemblies 10 easily attaches the data storage device 80 to the computer enclosure 90. The fingers 46 of each rail 12 resiliently contact the adjacent guiding groove 96 of the drive bracket 95 of the computer enclosure 90. The tongues 44 of each rail 12 resiliently contact the inside of the adjacent side wall (not labeled) of the drive bracket 95. Thus a plurality of grounding paths between the data storage device 80 and the computer enclosure 90 are established.

In disassembly, the handlebars 47 of the fasteners 14 are pushed toward each other. Thus the handle portions 32 of the fasteners 14 are displaced inwardly. This allows the tabs 98 of the front panel 92 to disengage from the respective apertures 48 of the fasteners 14. The data storage device 80 is then easily withdrawn from the opening 94 of the computer enclosure 90, with the pair of rail assemblies 10 sliding along the guiding grooves 96 of the drive bracket 95.

It is understood that the invention may be embodied in other forms without departing from the spirit thereof. Thus, the present examples and embodiments are to be considered in all respects as illustrative and not restrictive, and the invention is not to be limited to the details given herein.

We claim:

1. A rail assembly adapted to mount a data storage device to a computer enclosure comprising:

a rail adapted to be slidably received in a guiding groove of the computer enclosure, the rail having at least a post adapted to engage with at least a hole defined in a side wall of the data storage device; and an electrically conductive fastener secured to the rail, the fastener forming at least a resilient contact adapted to electrically connect with the computer enclosure;

wherein the rail has a base and at least a flange extending from at least one of respective opposite longitudinal edges of the base to define a receiving space therebetween for receiving the fastener therein.

2. The rail assembly as described in claim 1, wherein each flange defines at least a slot, and the at least a resilient contact of the fastener comprises at least a resilient finger extending through the at least a slot and electrically contacting the computer enclosure.

3. The rail assembly as described in claim 1, wherein the fastener has a body from which the at least a resilient contact extends.

4. The rail assembly as described in claim 3, wherein the fastener further has at least a handle portion and at least an aperture defined in each handle portion adapted to engage with at least a tab of the computer enclosure.

5. The rail assembly as described in claim 1, wherein at least a protrusion extends from the base of the rail into the receiving space, and wherein the fastener defines at least a through hole for engagingly receiving the at least a protrusion.

6. The rail assembly as described in claim 5, wherein each protrusion is a hollow cylinder.

7. The rail assembly as described in claim 4, wherein at least a resilient portion of the fastener connects the handle portion to the body, each resilient portion being elastically deformable to facilitate engagement of each aperture of the fastener with each tab of the enclosure and to facilitate disengagement thereof.

8. An enclosure assembly, comprising:

a computer enclosure including a drive bracket defining guiding grooves therein;

a rail attached to each of two opposite sides of a data storage device and guidably moving along the corresponding guiding groove; and an conductive fastener attached to the rail opposite to said data storage device, said fastener including spring fingers to mechanically and electrically contact the guiding grooves, a handlebar formed on a rear end of the fastener for moving the corresponding portion of the fastener toward the rail.

9. The assembly as described in claim 8, wherein said fastener includes means for holding. the data storage device in the drive bracket in a front-to-back direction.

10. A rail assembly adapted to mount a data storage device to a computer enclosure, comprising:

a rail including an elongated base with a pair of flanges perpendicularly extending from two opposite longitudinal edges, each of said flanges defining slots therein;

a conductive fastener including an elongated body attached to the base of the rail, and spring fingers positioned around two opposite longitudinal edges of the body and extending throughout the corresponding slots, respectively; and a handlebar spaced from the rail in a lateral direction, said handlebar being deflectable with regard to the rail along said lateral direction.

* * * * *